United States Patent [19]

Riihimäki et al.

[11] Patent Number: 4,493,098

[45] Date of Patent: Jan. 8, 1985

[54] X-RAY COLLIMATOR

[75] Inventors: Esko Riihimäki, Espoo; Ossi Korhola, Helsinki, both of Finland

[73] Assignee: Radiographic Screens Oy, 03, ; FIX

[21] Appl. No.: 372,203

[22] Filed: Apr. 26, 1982

[30] Foreign Application Priority Data

Apr. 29, 1981 [FI] Finland .................................. 811339

[51] Int. Cl.[3] .............................................. G03B 41/16

[52] U.S. Cl. ...................................... 378/146; 378/145

[58] Field of Search .......................................... 378/146

[56] References Cited

U.S. PATENT DOCUMENTS 4,096,391 6/1978 Barnes ................................ 378/146

4,097,748 6/1978 Monvoisin .......................... 378/146

*Primary Examiner*—Craig E. Church

*Attorney, Agent, or Firm*—McGlew and Tuttle

[57] ABSTRACT

The invention relates to a collimator employed in X-ray equipment, which collimator comprises three or more perforated collimator plates. The purpose of the collimator is to prevent stray radiation, i.e. radiation scattered from the object under examination, from falling on the film. In a collimator according to the invention the collimator plates are arranged to form two groups. At least one collimator plate is located between the X-ray radiation source and the object under examination, and two or more collimator plates are located between the object and the X-ray film cassette. The holes of the collimator plates are superposed when seen from the focal point of the radiation source. The plate located nearest to the X-ray film casette is longer than the rest. It prevents stray radiation from falling on the film in the X-ray film cassette, when the collimator is moved between its extreme positions during the photography operation. On the line determined by the focal point of the X-ray tube there is adjusted a rod, whereto the collimator plates are in turn geared so that they remain horizontal during the photography operation. The holes of the collimator plates have a similar, for example diamond-like shape, and they are arranged in rows obliquely with respect to the transition direction of the collimator, in such a fashion that the back end of a row falls next to the front end of the following row.

9 Claims, 4 Drawing Figures

X-RAY COLLIMATOR

FIELD AND BACKGROUND OF THE INVENTION

The present invention relates to a collimator, specifically an X-ray collimator formed of three or more perforated collimator plates.

Collimators are employed in X-ray equipment and in order radiography equipment utilizing radiation with short wavelength. The purpose of the collimator is to prevent the radiation which is scattered from the object under examination, the so-called stray radiation, from affecting the film.

Stray radiation deteriorates the quality of a radiograph by weakening both contrast and sharpness. The thicker the object under examination, the more there occurs stray radiation. The amount of scattered radiation, for example in patient radiography, often surmounts the amount of unscattered radiation. The amount of scattered radiation can even be of multiple quantity in comparison with the amount of unscattered radiation.

In the prior art, collimators are known which consists of one or two collimator plates, which are placed near the film cassette. These plates are generally composed of narrow, upright bands of leaden plate, and in between the plates there is located a layer of plastic or aluminium, which layer easily transmits X-ray radiation. Depending on the particular application, the thickness of the collimator plates as well as the number of slits per length unit can alternate.

Among the drawbacks of the above described slit collimator the most conspicuous is the fact that it does not obstruct stray radiation directed parallel to the slits. The collimator functions best in the direction perpendicular to the slits. Even such scattered X-ray quantums which are quite oblique can affect the film, if they happen to pass through the slit. It is true that this drawback can be avoided by constructing a double-layer collimator plate with two slit collimators of the above described type positioned crosswise on top of each other. But because the structure of only one slit collimator plate is fairly complicated, and consequently the price is high, it is clear that these problems become with a double plate. Moreover, the double collimator plate absorbs an increased amount of the X-ray radiation needed in the radiography operation.

The German Patent Publication DE-OS No. 2 031 203 introduces a collimator plate which is placed near the film cassette and which is provided with perforations at regular intervals or at random intervals with certain limitations. These perforations obstruct stray radiation from affecting the film better than the slits. The drawback of this collimator arrangement is that only one collimator plate is used in the neighbourhood of the film cassette. Consequently the scattered radiation is not effectively eliminated in this arrangement either.

SUMMARY OF THE INVENTION

The object of the present invention is to eliminate the above mentioned drawbacks and to realize a simple collimator which is suited for X-ray radiography. These objects are achieved by means of the characteristic features of the invention.

The greatest advantage of the collimator of the invention is that the negative effects of stray radiation can be effectively prevented. Before the X-ray radiation falls on the object under examination, it is divided into cones by means of the collimator plate, which plate, in addition to other functions, prevents the radiation from falling outside the object under examination. After penetrating the object, the radiation cones fall on the mutually adjustable collimator plates provided with holes at matching points with respect to the cones. These plates effectively eliminate most of the oblique, scattered X-ray quantums. These radiation cones which create the radiograph, can penetrate the plate only after penetrating the object under examination. The quality of the resulting X-ray radiograph can be further improved by suitably forming the collimator holes in a diamond-shaped or parallelogram-shaped fashion.

BRIEF DESCRIPTION OF THE DRAWINGS

In the following the invention is explained in detail with reference to the appended drawings.

FIG. 4 shows a detail of the collimator plate of FIG. 3.

DESCRIPTION OF THE PREFERRED EMBODIMENT

Figure 1:
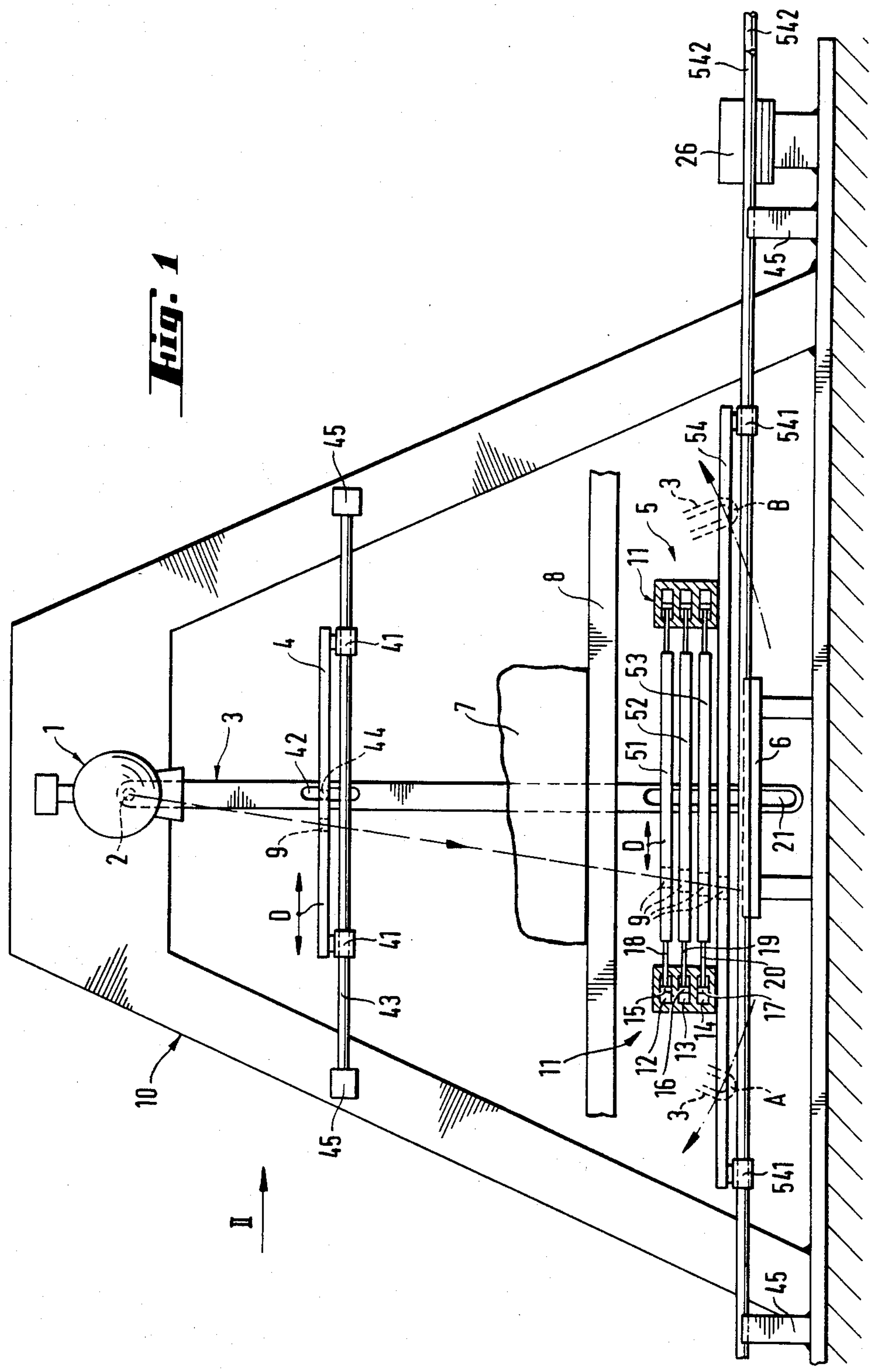
FIG. 1 shows an X-ray installation where the collimator of the invention is used, seen from the front.
Figure 2:
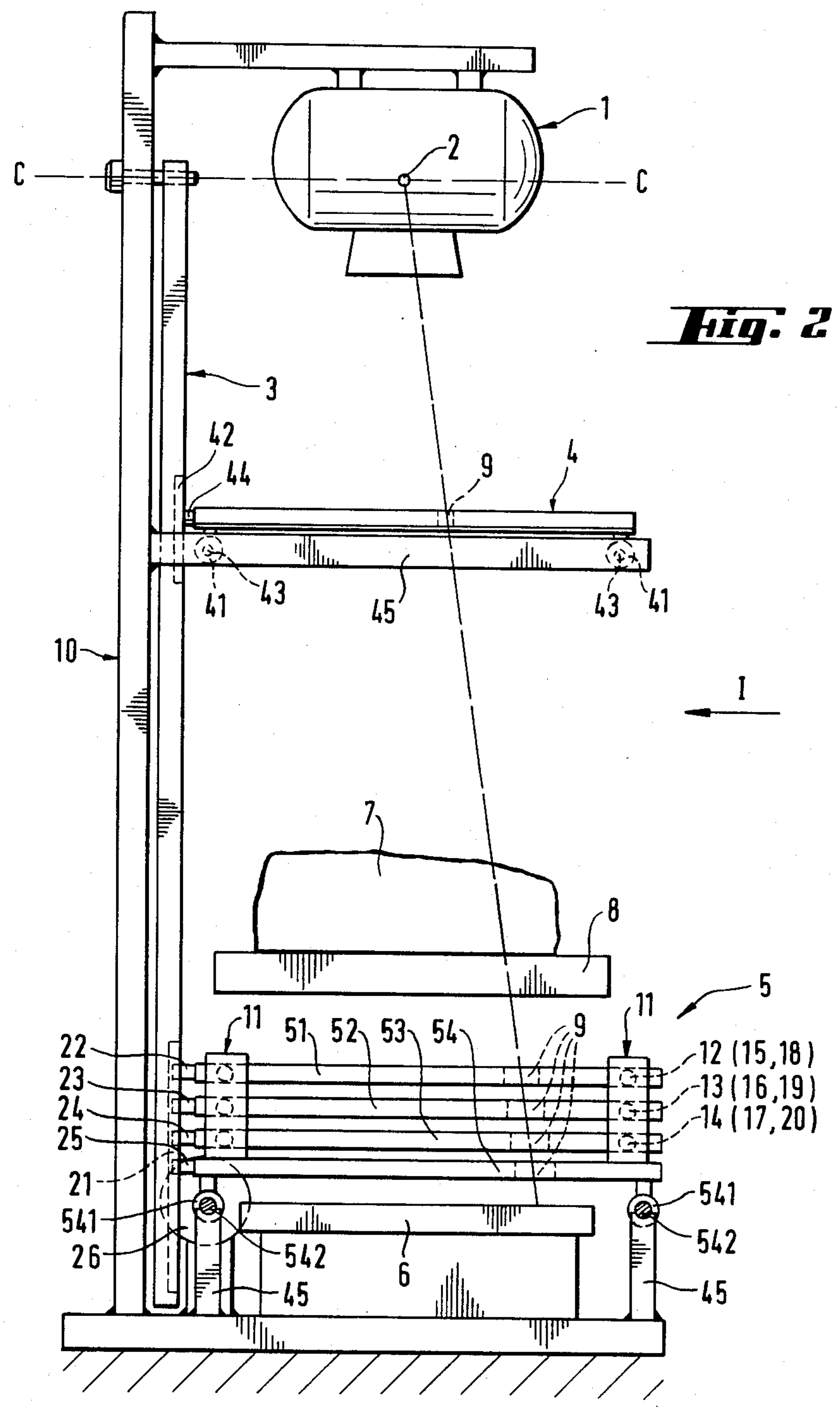
FIG. 2 shows the X-ray installation of FIG. 1, seen from the side.

FIGS. 1 and 2 illustrate one embodiment of the X-ray collimator according to a invention. Exactly on the horizontal line C—C determined by the focal point 2 of the X-ray tube 1 or of the radiation source (FIG. 2) there is pivotally mounted a rod 3 or equivalent, on a housing 10. Collimator plates 4 and 5 are engaged directly to the rod 3 in such a fashion that when moving the rod 3 in pendulum-like fashion, the plates remain essentially horizontally suspended from guides or their equivalent provided on the housing or frame 10. Rod 3 thus forms plate drive means.

The collimator plates are perforated so that their holes are superposed when seen from the focal point 2 of the radiation source. The collimator plate 4 is interposed between the X-ray tube 1 and the object 7 under examination, the or just support means object laying on a radiation-penetrating table plate or just support means 8. Among the collimator plates 5, which are respectively interposed between a film object 7 and the cassette 6, one plate 54 is preferably three times longer than the rest. It protects the cassette 6 from receiving stray radiation when the collimator is in either of its extreme positions (A, B). Cassette 6 is provided on a second support means as shown.

The collimator plates 4 and 5 can be attached to the housing 10 and the rod 3 in the following way. The rod 3 is provided with tracks 42, 21 or guides extending in the long direction of the rod. The collimator plates 4, 5 are equipped with slide shoes or rolls 44, and 22–25 for the tracks 42, 21 of the rod 3 so that the plates 4, 5 can be moved along the tracks in the vertical direction. The plates 4, 5 can be turned around the side shoes 44, and 22–25 as a point of suspension. The collimator plates 4, 54 are equipped with slides 41, 541 fitted on the slide bars or guides 43, 542. The guides 43, 542 are attached to the supports 45 and further to the housing 10.

The supports 11 are set on the long collimator plate 54 for collimator plates 51–53. The supports have the tracks or holes 12–14 into which the plates 51–53 are attached by means of slide shoes 15–17 and possibly the support rods 18–20 so that the plates 51–53 can be moved horizontally. This is substantially perpendicular to the X-ray direction. The plates 51–53 are further attached to the track 21 of the rod 3 with bearings as described previously.

The rod 3 with the collimator plates 4, 5 is moved pendulumwise by means of an electric motor 26. One of the guides 542*a* of the long collimator plate 54 is attached to the electric motor 26. The guide 542*a* has an external screw thread at least partly on its length. The slide shoe 541*a* has a respectively cut inside thread. The motor 26 rotates the guide 542*a*. Depending on the rotating direction of the guide 542*a* pulls or pushes the slide shoe 541*a*, and the collimator plate 54, the rod 3 and the other collimator plates 4, 51–53 are removed. There can also be extreme position switches adjacent the plate 54 or the guide 542*a*. The switches stop the motor 26, when the extreme position A, B is achieved.

Radiography is carried out so that the collimators 4 and 5 are translated in the direction D from the extreme position A to the extreme position B at the same time as the X-ray tube emits radiation. From the holes 9 of the collimator plate 4 the radiation cones which are formed pass through object 7 under examination, and further through the collimator plates 5 and onto the film cassette, and thus create the described radiogram of the object 7. The stray radiation, the major part whereof forms an angle with respect to the primary radiation, is absorbed into the collimator plates 5.

Figure 3A:
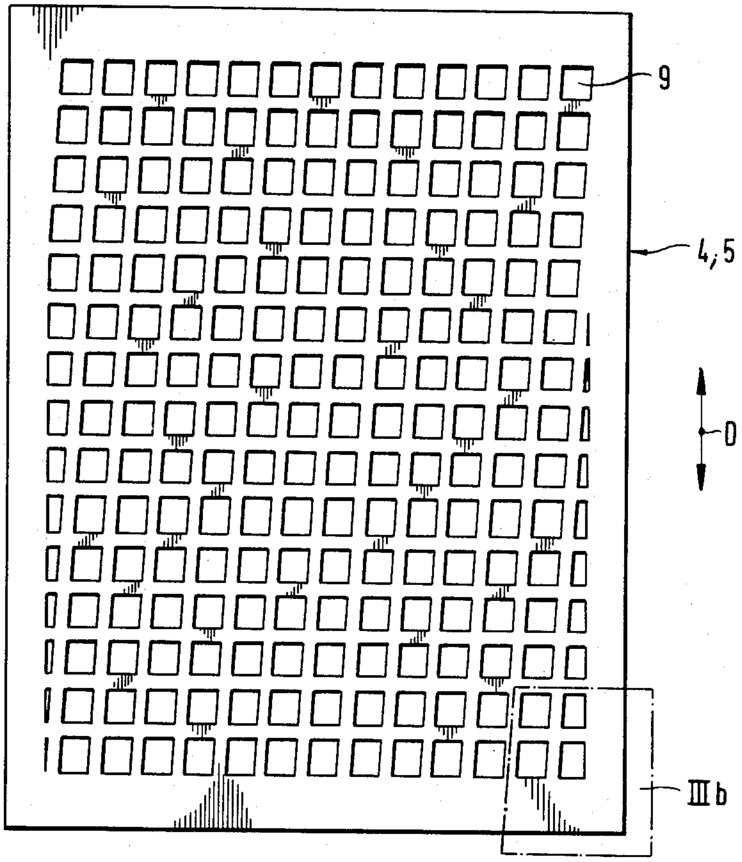
FIG. 3 shows one preferred embodiment of the collimator plate seen from the top.
Figure 3B:
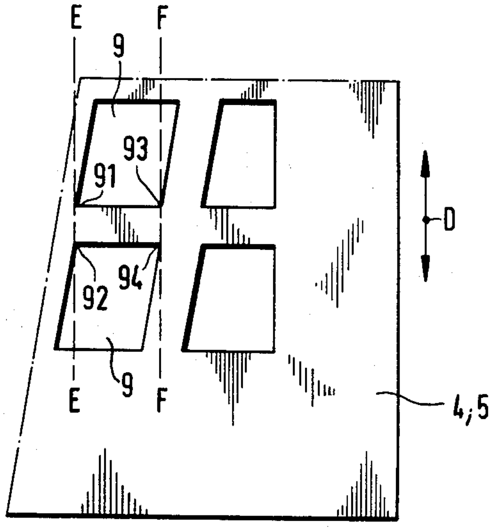

The collimator plates 4, 5 are profitably perforated according to FIG. 3. The holes are diamonds or parallelograms located at regular intervals. They are positioned on the collimator plate so that rows of holes run in a slanted direction with respect to the collimator translation direction D, in such a fashion that the back end of the first row falls next to the front end of the following row, etc. That is, one end of one row is aligned with an opposite end of an adjacent row in the translation Direction D. Further the corners 91, 92; 93, 94 of successive holes 9 of each row are on the same line E; F in the translation direction D as seen in FIG. 4. As shown in FIG. 3*a*, the holes also lie in columns extending perpendicular to the translation direction D, with the columns being at an acute angle to the rows. The most important thing in the positioning of the holes is naturally the principle that when radiographing without the object 7, the film receives an equal amount of radiation throughout, i.e. the irradiation is even and neither streaks nor other similar defects occur in the film.

The collimator plates are manufactured of a generally known material or compound with high atomic weight, which effectively absorbs the radiation emitted by the radiation source. Such possible metals are lead or tantalum, or compounds like steel. The thickness of the collimator plates is preferably between 0.1 to 1 mm, the diameter of the holes between 1 and 20 mm and the intervals of the holes between 0.5 and 5 mm. The holes are thus at least as wide as the thickness of the plates.

In the above description the invention has been explained with reference to one preferred embodiment only. It is naturally clear that this embodiment is used only as an example, and it is by no means intended to limit the scope of the invention to include nothing else but the example. For example, the collimator plate 4 can consists of several collimator plates. The shape of the holes in the collimator plates can vary. Thus many modifications in the structure of the device of the invention are possible without deviating from the inventive concept specified in the claims.

We claim:

1. In an X-ray device having a source of X-rays emitted from a focal point, first support means for supporting an object to be X-rayed and second support means for supporting film for receiving an X-ray image, the X-rays being emitted in an X-ray direction, an X-ray collimator comprising:

at least three perforated collimator plates each having a plurality of holes, at least one of said plates positioned between the focal point and the first support means and at least two of said plates positioned between the first and second support means, with said holes of each plate being at least as wide as a thickness of each plate; and plate drive means connected to said at least three perforated plates for moving said plates in a collimator translation direction from a first extreme position to a second extreme position, said translation direction being substantially perpendicular to the X-ray direction, said plate drive means connected to said plates for maintaining said plates parallel to each other and for maintaining said plurality of holes for each of said plates aligned with each other and aligned with respect to the focal point;

said plurality of holes of each of said plates being positioned on said plates to permit alignment of said holes with respect to the focal point;

said plurality of holes on each of said plates each being similar in shape to the other, said holes on each plate positioned in a plurality of rows and columns, said columns extending substantially perpendicular to said translation direction and said rows extending at an acute angle to said columns.

2. An X-ray collimator according to claim 1 wherein each of said plates is made of metal having high atomic weight for preventing passage of X-rays.

3. An X-ray collimator according to claim 2 wherein said metal is chosen from the group consisting of lead, tantalum and steel.

4. An X-ray collimator according to claim 1 wherein each row has a first end in a translation direction adjacent said first extreme position and a second end adjacent said second extreme position, a first end of one row being aligned with a second end of an adjacent row in said translation direction.

5. An X-ray collimator according to claim 4 wherein each of said holes is parallelagram in shape.

6. An X-ray collimator according to claim 5 wherein two corners of one side of each hole are aligned in said translation direction with two corners of an opposite side of an adjacent hole in one row.

7. An X-ray collimator according to claim 1 wherein said plates extend horizontally.

8. An X-ray collimator according to claim 7 including a frame, said plate drive means comprising a rod pivotally mounted to said frame at a level of the focal point and engaged with each of said plates, said rod pivotable in pendulum-like fashion between said first and second extreme positions and in said collimator translation direction.

9. An X-ray collimator according to claim 8 wherein one of said plates positioned closest to the second support for supporting film is larger than the other plates and sufficiently long in said collimator translation direction to cover film on said second support means and prevent stray radiation from affecting such film at any position of said rod and plates between said first and second extreme positions.

* * * * *